US008296330B2

(12) United States Patent
Bennett et al.

(10) Patent No.: US 8,296,330 B2
(45) Date of Patent: Oct. 23, 2012

(54) HIERARCHICAL CLASSIFICATION

(75) Inventors: Paul Nathan Bennett, Kirkland, WA (US); Nam H. Nguyen, My Tho (VN)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 12/476,898

(22) Filed: Jun. 2, 2009

(65) Prior Publication Data
US 2010/0306282 A1 Dec. 2, 2010

(51) Int. Cl.
*G06F 17/30* (2006.01)
(52) U.S. Cl. ........................................ 707/803
(58) Field of Classification Search .................. None
See application file for complete search history.

(56) References Cited

U.S. PATENT DOCUMENTS

| | | | | |
|---|---|---|---|---|
| 5,406,477 | A | * | 4/1995 | Harhen .............................. 703/6 |
| 5,634,087 | A | * | 5/1997 | Mammone et al. .............. 706/25 |
| 6,108,648 | A | * | 8/2000 | Lakshmi et al. ........ 707/999.002 |
| 6,243,695 | B1 | * | 6/2001 | Assaleh et al. ................... 706/20 |
| 7,043,075 | B2 | | 5/2006 | Gutta |
| 7,349,917 | B2 | * | 3/2008 | Forman et al. ......... 707/999.102 |
| 7,451,065 | B2 | * | 11/2008 | Pednault et al. ................... 703/2 |
| 7,457,801 | B2 | | 11/2008 | Liu et al. |
| 7,599,898 | B2 | * | 10/2009 | Tesauro et al. ................... 706/17 |
| 7,809,723 | B2 | * | 10/2010 | Liu et al. ....................... 707/736 |
| 7,958,113 | B2 | * | 6/2011 | Fan et al. ....................... 707/718 |
| 2003/0059106 | A1 | * | 3/2003 | Gutta ............................... 382/158 |
| 2004/0181553 | A1 | * | 9/2004 | Stockfisch ............. 707/999.107 |
| 2005/0192951 | A1 | * | 9/2005 | Day et al. ........................... 707/3 |
| 2005/0240544 | A1 | * | 10/2005 | Kil et al. ........................ 706/45 |
| 2006/0074875 | A1 | * | 4/2006 | Faunce et al. ..................... 707/3 |
| 2006/0167655 | A1 | * | 7/2006 | Barrow et al. ................. 702/181 |
| 2007/0233435 | A1 | * | 10/2007 | Bradski ............................ 703/2 |
| 2008/0126280 | A1 | | 5/2008 | Liu et al. |
| 2008/0133466 | A1 | | 6/2008 | Smith et al. |
| 2009/0030864 | A1 | * | 1/2009 | Pednault et al. ................ 706/45 |

OTHER PUBLICATIONS

A. J. Robison et al., Classification Using Hierarchical Mixtures of Experts, 1994,Workshop on Neural Network for signal processing IV, pp. 177-186.*
Michael I. Jordan et al., Hierarchical Mixtures of Experts and the EM algorithm, Aug. 6, 1993, M. I. T, pp. 1-30.*
Secker, Andrew, et al., An Experimental Comparison of Classification Algorithms for the Hierarchical Prediction of Protein Function, http://www.cs.kent.ac.uk/projects/biasprofs/pubs/ukkdd.pdf.
DeCoro, Christopher, et al., Bayesian Aggregation for Hierarchical Genre Classification, Princeton University, Department of Computer Science, copyright 2007 Austrian Computer Society, http://www.cs.princeton.edu/~zbarutcu/papers/bayesgenre.pdf.
Punera, Kunal, et al., Enhanced Hierarchical Classification Via Isotonic Smoothing, WWW 2008, Apr. 21-25, 2008, Beijing, China, pp. 151-160, http://www2008.org/papers/pdf/p151-puneraA.pdf.
Cesa-Bianchi, Nicolò, et al., Incremental Algorithms for Hierarchical Classification, Journal of Machine Learning Research 7, pp. 31-54, copyright 2006 Nicolò Cesa-Bianchi, Claudio Gentile and Luca Zaniboni, http://jmlr.csail.mit.edu/papers/volume7/cesa-bianchi06a/cesa-bianchi06a.pdf.

* cited by examiner

*Primary Examiner* — Mark A Radtke
*Assistant Examiner* — Jacques Veillard
(74) *Attorney, Agent, or Firm* — The Law Office of Michael E. Kondoudis

(57) ABSTRACT

The hierarchical approach may start at the bottom of the hierarchy. As it moves up the hierarchy, knowledge from children and cousins is used to classify items at the parent. In addition, knowledge of improper classifications at a low level are raised to a higher level to create new rules to better identify mistaken classifications at a higher level. Once the top of the hierarchy is reached, a top down approach is used to further refine the classification of items.

20 Claims, 7 Drawing Sheets

HIERARCHICAL CLASSIFICATION

BACKGROUND

This Background is intended to provide the basic context of this patent application and it is not intended to describe a specific problem to be solved.

Hierarchical taxonomies are useful for organizing and structuring access to information in a variety of contexts. In many of these cases, automatic classification methods are needed to classify a new item without human intervention but classifying new items into the most likely node in the hierarchy to quickly process new library items, analyze the sense of use of a word in context to assist in natural language processing, or identify new species or previously unrecognized relationships.

Classifying new items in a hierarchical taxonomy can have problems. A misclassification high in the hierarchy can be very difficult to undo as the misclassification may not be recognized until well down the hierarchy, if the error is even recognized at all. Trying to track back up the hierarchy and re-classify an item is time consuming and inefficient. In addition, knowledge from lower in the hierarchy is seldom used to classify items higher in the hierarchy. For example, knowledge of what is lower is a hierarchy may be useful in determining the proper branch to take higher in the hierarchy—effectively allowing a classification method to only distinguish between the most likely subtrees of the hierarchy instead of all subtrees.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An improved hierarchical classification method is disclosed. The hierarchical approach may start at the bottom of the hierarchy. As it moves up the hierarchy, knowledge from children and cousin categories is used to classify items at the parent category. In addition, knowledge of improper classifications at a low level are raised to a higher level to create new rules to better identify mistaken classifications at a higher level. Once the top of the hierarchy is reached, a top down approach is used to further refine the classification of items.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
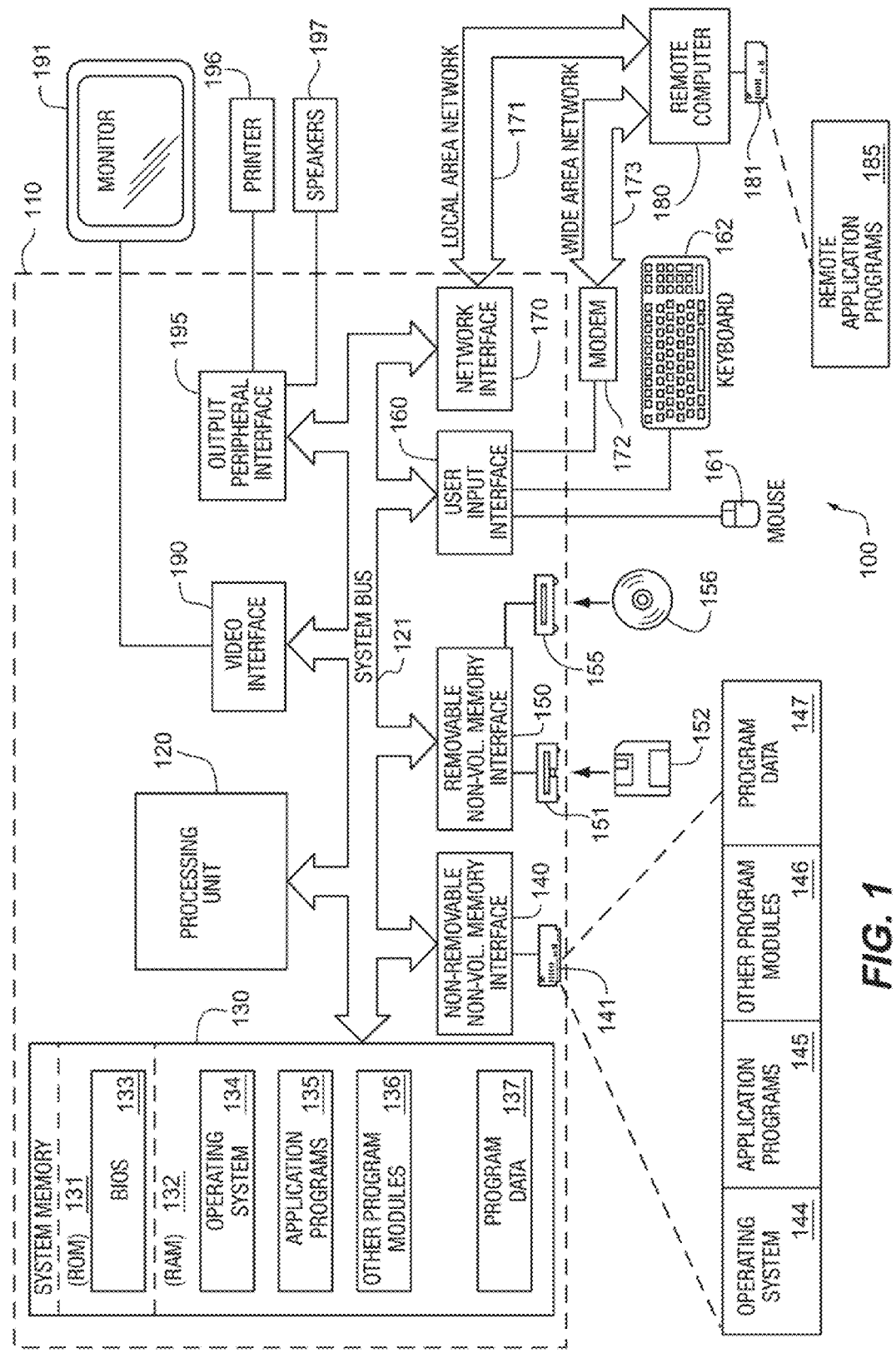
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171, a peer to peer network, and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
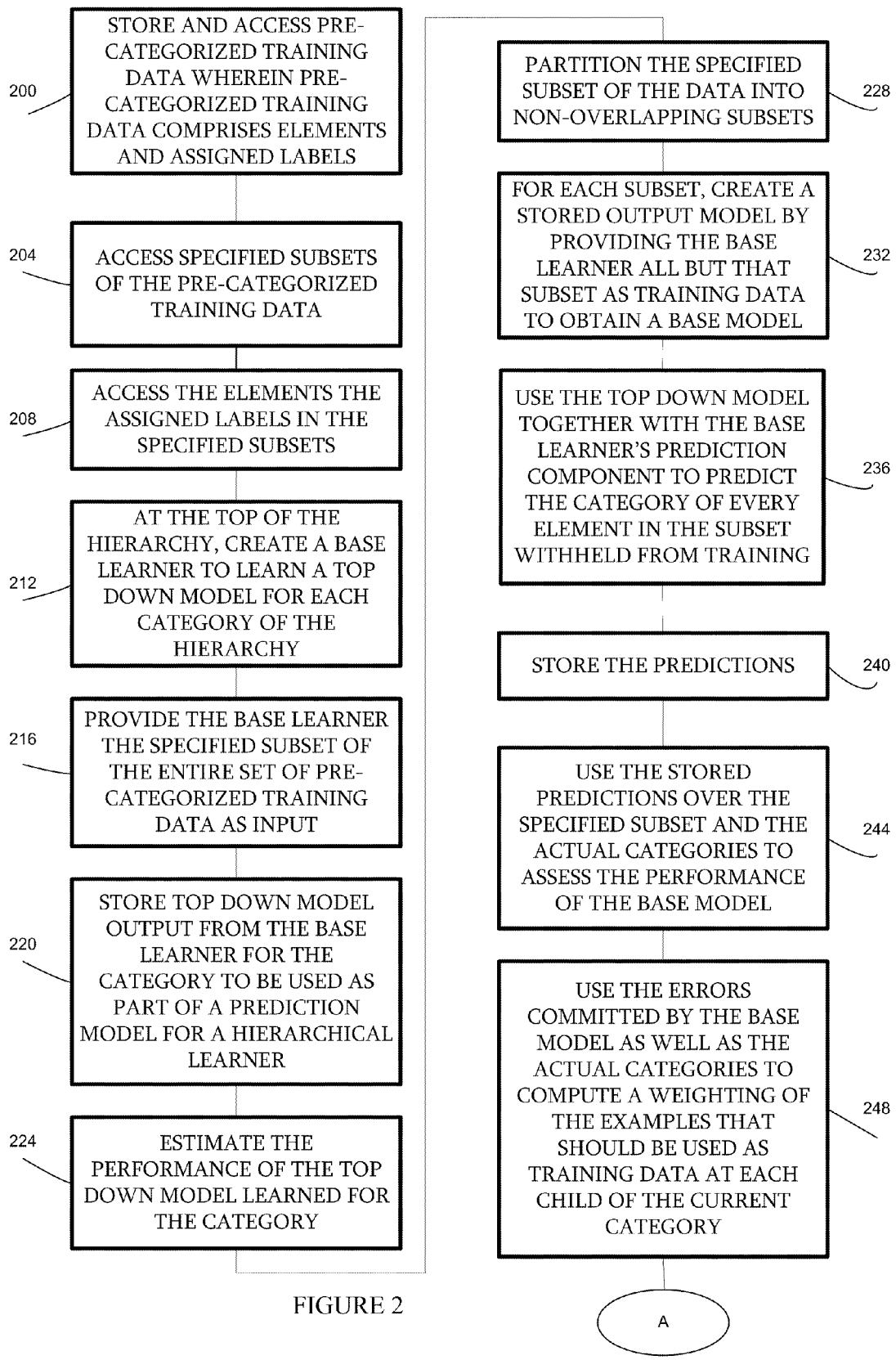
FIGS. 2 and 2A are illustrations of a method of improved hierarchical classification.
Figure 2A:
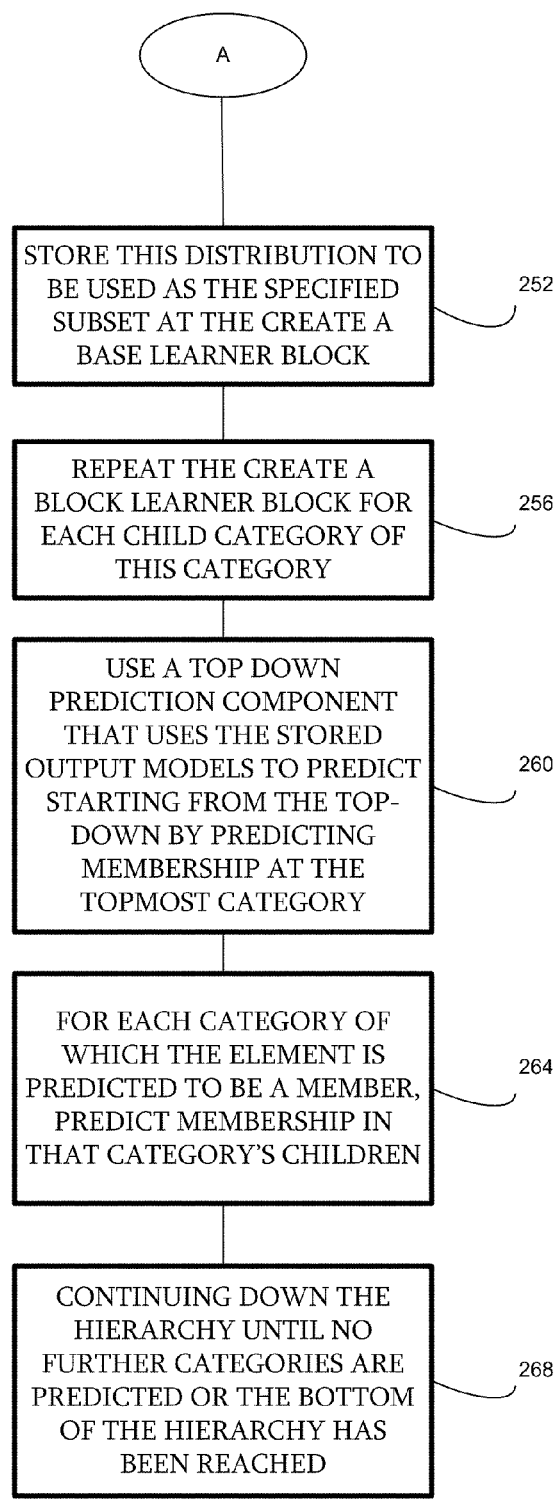
Figure 3:
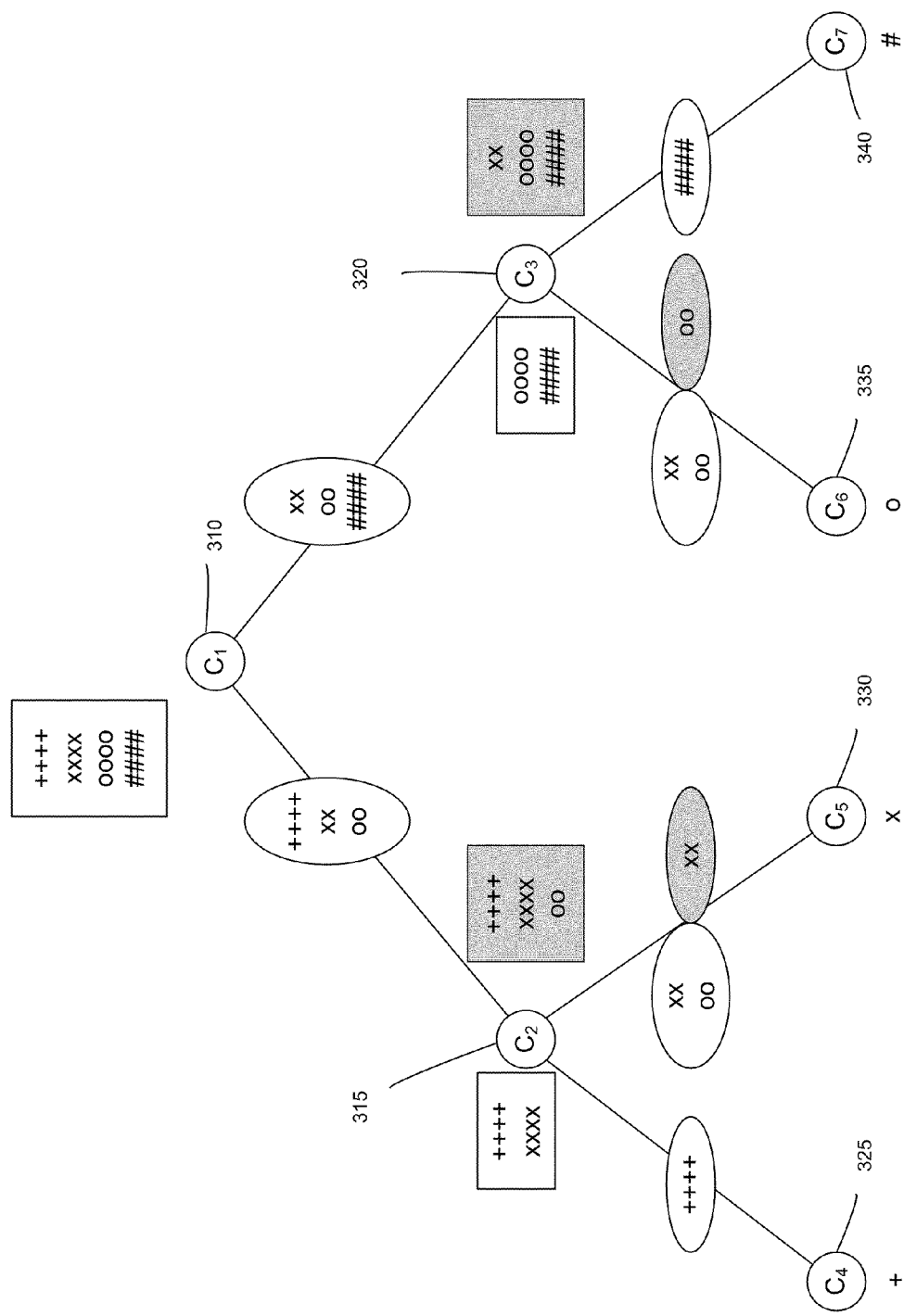
FIG. 3 is an illustration of a hierarchy illustrating improper classifications and improved classifications.

FIG. 2 illustrates a method of electronically classifying data received from a source into a hierarchical tree of categories. The data may be electronic search data such as data used by modern search engines. In another embodiment, the data are files on a hard drive of a computer. In short, the method may be applied to a collection of categorizable electronic data. A sample hierarchical tree 305 is illustrated in FIG. 3 where lower nodes are referred to as children of the parent nodes. Any node that has no children is referred to as a leaf node, and all such nodes are referred to as the leaves of the hierarchy.

Figure 5:
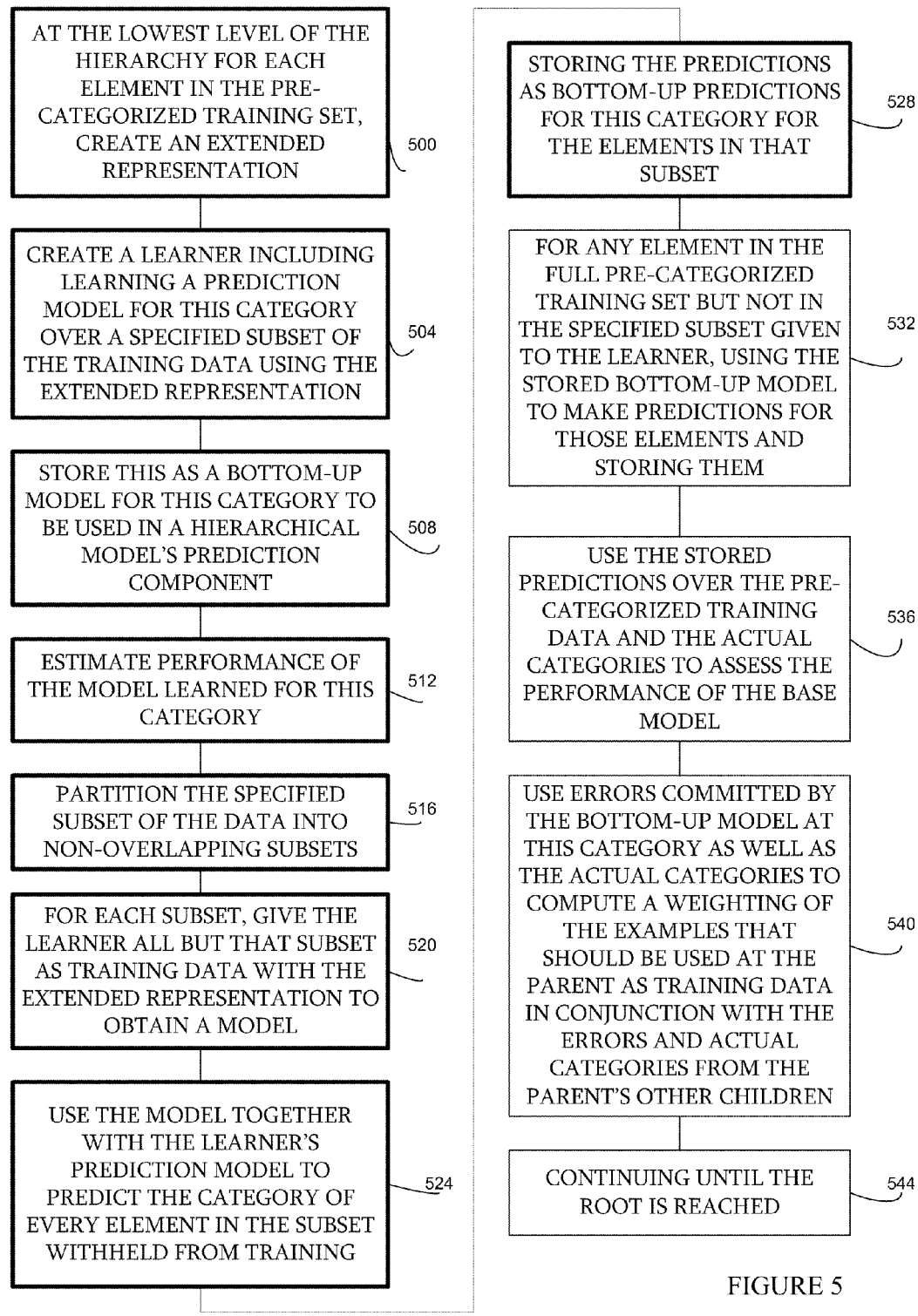
FIG. 5 is an illustration of another method of improved hierarchical classification.
Figure 6:
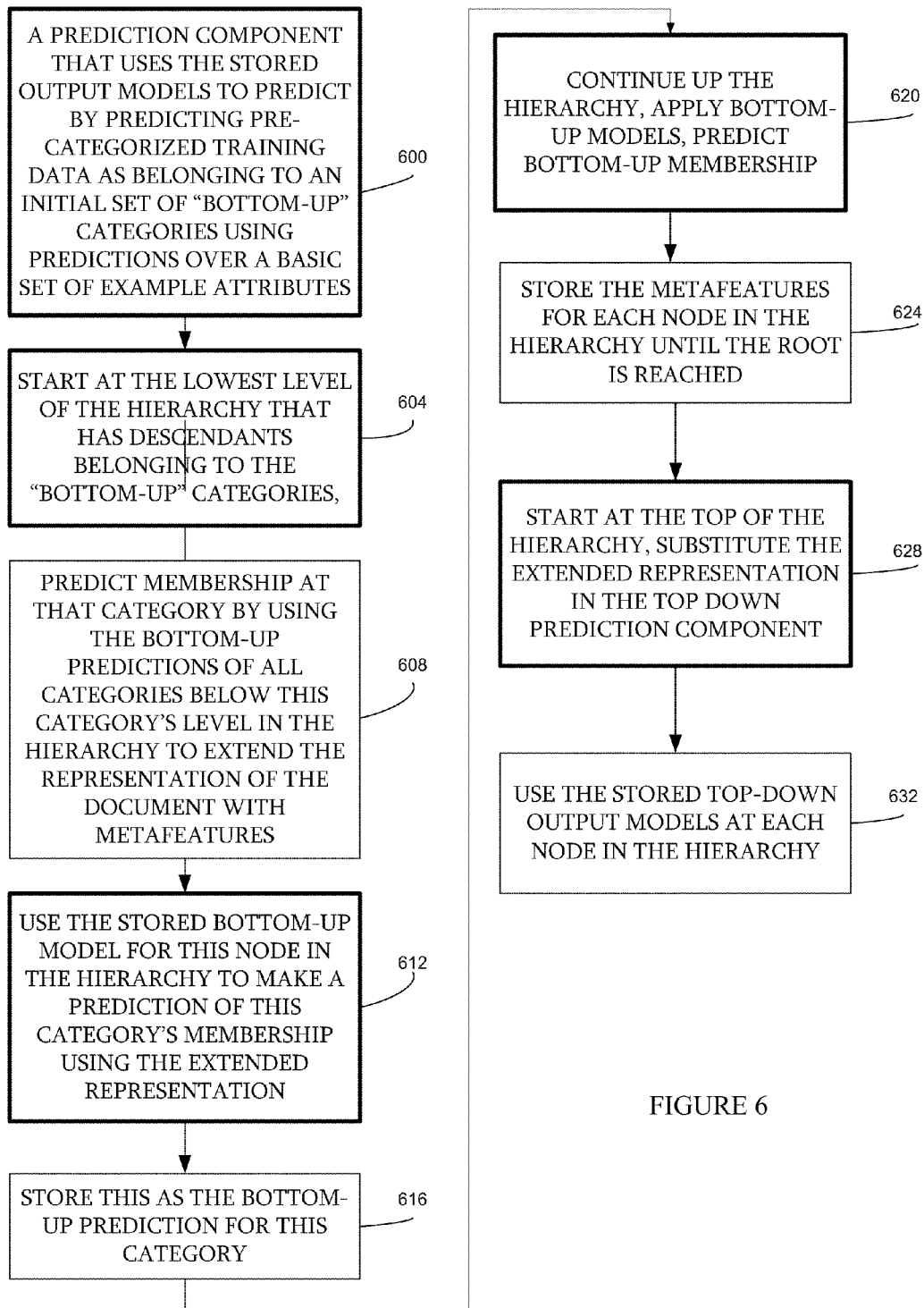
FIG. 6 is an illustration of a top down approach used to further refine the classification of items.

There are two primary improved methods. The first method uses new top-down training methods to predict examples of improper classifications that are likely to occur at a category (FIG. 2). The training method then uses these identified likely errors to produce a final trained model which has a reduced likelihood of making or passing on errors over items similar to the predicted errors. The actual prediction phase for this method is essentially the same as the standard approach currently; this means computationally the new method is as efficient as standard methods during prediction but is able to produce a model that has a higher accuracy. The second method may start at the bottom of the hierarchy and includes both new training methods as well as new prediction methods (FIG. 5) In addition, once the top of the hierarchy is reached, the new top down approaches are used to further refine the classification of items (FIG. 6)

Also, training and predicting are mentioned. During training, an algorithm may be given a set of pre-classified example (documents) together and optionally a set of unclassified examples. The training algorithm then learns a model (usually mathematical) model of how to automatically place examples into categories. This algorithm is typically trained in a manner that minimizes some measure of error over the training set. If designed well, the training will lead to low error during the prediction phase. Training often involves hiding the label of a set of examples, predicting over them in a fashion similar to what would be done in the prediction phase, and when errors occur, optimizing the model to further reduce the likelihood of making these errors. Once the training model is at a state of completion, it may be used to predict or test. Predictions are usually a categorization done automatically which may or may not be accurate and label is a categorization provided by a human or some other trusted source which is assumed o be the "ground truth."

At block 200, pre-categorized training data that may include elements and assigned classes is used to learn an automatic categorization model which can be used to categorize as yet uncategorized data. This model may be used to classify an element in the pre-categorized data as belonging to an initial category. As an example in FIG. 3, $C_1$ 310 may represent TV shows, $C_2$ 315 may represent sports shows, $C_3$ 320 may represent movies, $C_4$ 325 may represent tennis, $C_5$ 330 may represent golf, $C_6$ 335 may represent drama and $C_7$ 340 may represent comedy. As is known, member of the lower nodes ($C_4$-$C_7$) also belong as part of the nodes above them and so on.

FIG. 3 illustrates using predicted behavior to change the training distribution and learns models that filter out errors. The training set for a standard approach may be illustrated by the white boxes and the gray boxes may illustrate where the method would differ. The effect on a test set is illustrated with standard classifications in white ovals and in gray when the method would differ. For instance, $C_5$ and $C_6$ are confused with each other half the time. FIG. 3 illustrates where a thraining set has 16 example whose membership is balanced between leaf nodes. As the method sees instances similar during training, it may learn models that halt error propagation—$C_6$'s "o" instances at node $C_2$ and $C_5$'s "x's" at $C_3$, improving accuracy at lower levels.

The initial assignment into categories may be obtained in a variety of ways. In one embodiment, a "flat" assignment system is used which matches the words and phrases in the entry to words and phrases in each category. Of course, other assignment systems are possible and are contemplated.

At block 204, specified subsets of the pre-categorized training data may be accessed. The subsets may be portions of the pre-categorized training data. In some embodiments, the pre-categorized training data is split into equal portions and in some embodiments, the subsets do not overlap.

At block 208, the elements and the assigned labels may be accessed in the specified subsets. The subsets along with the elements and the assigned labels may be stored in a memory such as RAM 132 or may be stored on a hard disk 141, a rotating disk 151, a cd, in a cloud, on a peer, etc. In addition, the elements and assigned labels may be stored in any appropriate file structure such a database, a flat file, a comma separated file, in an XML file, etc.

At block 212, the method may start at the top of the hierarchy. A base learner may be created to learn a top down model for each category of the hierarchy using a basic representation and the specified subset of the training data. At the top of the hierarchy, the subset may be the entire set.

At block 216, the base learner may be provided the specified subset of the entire set of pre-categorized training data as input. At block 220, the top down model output from the base learner for the category to be used as part of a prediction model for a hierarchical learner may be stored. The output may be stored in a manner and a form such that later models will have easy access to the output.

At block 224, the performance of the top down model learned for the category may be estimated. At block 228, the estimation may begin by partitioning the specified subset of the data into non-overlapping subsets. The number of subsets may be any useful number, such as five. In some embodiments, the subsets may be split such that each subset represents a roughly equal portion of the data, such as twenty percent.

At block 232, for each subset, a stored output model may be created. The stored output model may be created in a number of ways. In one embodiment, the base learner may be provided all but that subset as training data to obtain a base model. In general, the model may be a mathematical model of how to automatically place examples into categories.

At block 236, the top down model may be used together with the base learner's prediction component to predict the category of every element in the subset withheld from training. At block 240, the predictions may be stored. At block 244, the stored predictions may be used over the specified subset and the actual categories to assess the performance of the base model. In other words, the errors of the model will be noted so that they may be addressed and minimized.

Figure 4:
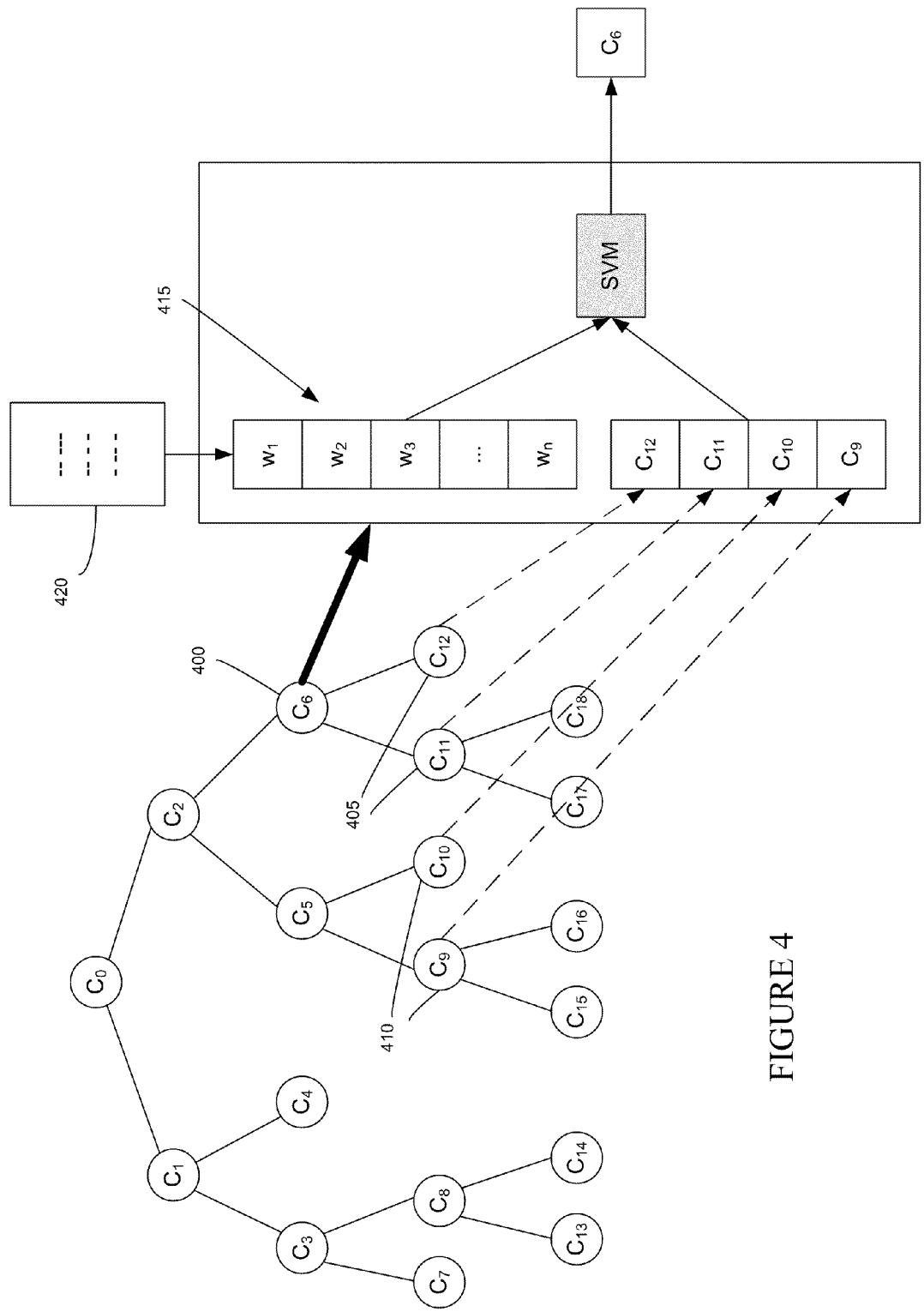
FIG. 4 is an illustration of using children and cousin knowledge to improve classification at a parent level.

At block 248, the errors committed by the base model as well as the actual categories may be used to compute a weighting of the examples that should be used as training data at each child of the current category. For example, some examples may provide better and more useful information than others. Referring to FIG. 4, the w_s are meant to be attributes representing the words in the document as a word vector (called bag of words sometimes). For example, w_1 may represent the word "soccer", and for a particular document represented as a word vector, the value of w_1 will be the proportion of words in that document that actually were "soccer".

At block 252, this distribution may be stored to be used as the specified subset at the creating a base learner block (block 212). At block 256, the creating a block learner block (212) may be repeated for each child category of this category. FIG. 4 is an illustration of one possible embodiment. If $C_6$ 400 is the parent node under analysis, the children 405 categorization may be from $C_{11}$, $C_{12}$ while the cousin 410 classification may be from $C_9$ and $C_{10}$, all of which are part of a training set 420.

At block 260, a top down prediction component may be used that uses the stored output models to predict starting from the top-down by predicting membership at the topmost category. At block 264, for each category of which the element is predicted to be a member, membership in that category's children may be predicted. At block 268, the method may continue down the hierarchy until no further categories are predicted or the bottom of the hierarchy has been reached.

The method may then proceed further by using a bottom up (as opposed to the previous top down) prediction model. FIG. 5 may illustrate a possible embodiment of a bottom up model that learns bottom-up prediction models for each category in the hierarchy.

At block 500, starting at the lowest level of the hierarchy, for each element in the pre-categorized training set, an extended representation may be created. The extended representation may entail extending the representation of an example with meta-attributes for this category computed using bottom-up predictions of all categories at lower levels than this category (at the lowest level only the base representation is used).

At block 504, a learner may be created. The learner may include learning a prediction model for this category over a specified subset of the training data using the extended representation. At block 508 the learner may be stored as a bottom-up model for this category to be used in a hierarchical model's prediction component.

At block 512, behavior and or performance may be estimated of the model learned for this category. At block 516, the specified subset of the data may be partitioned into non-overlapping subsets. At block 520, for each subset, the learner may be given all but that subset as training data with the extended representation to obtain a model.

At block 524, the model may be used together with the learner's prediction model to predict the category of every element in the subset withheld from training. At block 528, the predictions may be stored as bottom-up predictions for this category for the elements in that subset. At block 532, for any element in the full pre-categorized training set but not in the specified subset given to the learner, the stored bottom-up model may be used to make predictions for those elements and storing them.

At block 536, the stored predictions may be used over the pre-categorized training data and the actual categories to assess the performance of the base model, Again, at block 540, errors committed by the bottom-up model at this category as well as the actual categories may be used to compute a weighting of the examples that should be used at the parent as training data (in conjunction with the errors and actual categories from the parent's other children). At block 544, the method may continue up the tree until the root is reached.

While the previous method will help reduce errors, more can be done. FIG. 6 may illustrate additional steps that can further eliminate errors. At block 600, a prediction component may be used that uses the stored output models to predict by predicting pre-categorized training data as belonging to an initial set of "bottom-up" categories using predictions over a basic set of example attributes.

At block 604, the method may start at the lowest level of the hierarchy that has descendants belonging to the bottom-up categories. At block 608, the method may predict membership at that category by using the bottom-up predictions of all categories below this category's level in the hierarchy to extend the representation of the document with metafeatures. The metafeatures may provide additional detail. Referring to FIG. 4, the "SVM" block is one particular basic machine learning algorithms that can be used to learn a model. In this case, the model will learn weights to place on each of the word attributes. In the new method the representation of the document is extended to include the predicted membership of the cousin categories 410, and the learning method will learn weights for both the word attributes (W1-Wn) and these new predicted membership attributes that may be used to make a prediction for the parent category.

At block 612, the stored bottom-up model for this node in the hierarchy may be used to make a prediction of this category's membership using the extended representation. At block 616, the prediction of this category's membership may be stored as the bottom-up prediction for this category. At block 620, the method may continue up the hierarchy, applying bottom-up models, predicting bottom-up membership. At block 624, the metafeatures for each node in the hierarchy may be stored until the root is reached.

At block 628, once the root is reached, starting at the top of the hierarchy, the extended representation may be substituted in the top down prediction component (FIG. 2) and at block 632, the stored top-down output models may be used at each node in the hierarchy.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A method creating a hierarchical learner to electronically classifying data received from a source into a hierarchical tree of categories comprising:

storing and accessing pre-categorized training data wherein the pre-categorized training data comprises elements and assigned labels;

accessing specified subsets of the pre-categorized training data;

accessing the elements the assigned labels in the specified subsets;
starting at the top of a hierarchy;
  creating a base learner to learn a top down model for each category of the hierarchy using a basic representation and a specified subset of the training;
    providing the base learner the specified subset of an entire set of pre-categorized training data as input;
    storing top down model output from the base learner for a category to be used as part of a prediction model for the hierarchical learner;
  estimating performance of the top down model learned for the category by:
    partitioning the specified subset of the data into non-overlapping subsets;
    for each subset, creating a stored output model comprising:
      providing the base learner all but that subset as training data to obtain a base model;
      using the top down model together with the base learner's prediction component to create a prediction for the category of every element in the subset withheld from training;
      storing the predictions as stored predictions;
    using the stored predictions over the specified subset and actual categories to assess performance of the base model;
    using errors committed by the base model as well as the actual categories to compute a weighting of the examples that should be used as the training data at each child of the category;
    storing this distribution to be used as the specified subset at the creating a base learner block;
    repeating a creating a block learner block for each child category of the category;
using a top down prediction component that uses a stored output models to predict starting from a top-down by:
  predicting membership at a topmost category;
  for each category of which the element is predicted to be a member, predicting membership in that category's children;
  continuing down the hierarchy until no further categories are predicted or the bottom of the hierarchy has been reached.

2. The method of claim 1, further comprising:
learning bottom-up prediction models for each category in the hierarchy comprising:
  starting at a lowest level of the hierarchy
    for each element in the pre-categorized training data, creating an extended representation comprising extending a representation of an example with meta-attributes for the category computed using bottom-up prediction of all categories at lower levels than the category;
    creating a learner comprising learning a prediction model for the category over a specified subset of the training data using the extended representation and storing this as a bottom-up model for the category to be used in a hierarchical model's prediction component;
    estimating performance of the model learned for the category;
      partitioning the specified subset of the data into non-overlapping subsets;
      for each subset,
        giving the learner all but the subset as the training data with the extended representation to obtain a model;
        using the model together with the prediction model of the learner to predict the category of every element in the subset withheld from training;
        storing the predictions as bottom-up predictions for the category for the elements in the subset;
      for any element in a full pre-categorized training set but not in the specified subset given to the learner, using a stored bottom-up model to make predictions for those elements and storing them;
      using the stored predictions over the pre-categorized training data and the actual categories to assess the performance of the base model;
      using the errors committed by the bottom-up model at the category as well as the actual categories to compute a weighting of the examples that should be used at a parent as the training data in conjunction with errors and the actual categories from the parent's other children;
      continuing until a root is reached.

3. The method of claim 2, further comprising;
using a prediction component that uses the stored output models to predict by:
  predicting pre-categorized training data as belonging to an initial set of bottom-up categories using predictions over a basic set of example attributes;
  starting at the lowest level of the hierarchy that has descendants belonging to the bottom-up categories, predict membership at the category by:
    using the bottom-up predictions of all categories below a level of the category' in the hierarchy to extend the representation of a document with metafeatures;
    using the stored bottom-up model for this node in the hierarchy to make the prediction of this category's membership using the extended representation and store the prediction as the bottom-up prediction for the category;
    continuing up the hierarchy, applying bottom-up models, predicting bottom-up membership and storing the metafeatures for each node in the hierarchy until the root is reached;
  starting at the top of the hierarchy,
    substituting the extended representation in the top down prediction component and
    a stored top-down output models are used at each node in the hierarchy.

4. The method of claim 2, wherein extended representation comprises extending the representation of an example with meta-attributes for the category computed using bottom-up predictions of all categories at lower levels than the category.

5. The method of claim 1, wherein the specified subset comprises a weighting of the elements.

6. The method of claim 1, wherein the specified subset comprises an inclusion decision.

7. The method of claim 1, wherein errors comprise assigning data into an improper branch.

8. A computer storage medium comprising computer executable instructions for creating a hierarchical learner to electronically classifying data received from a source into a hierarchical tree of categories, the computer executable instructions comprising instructions for:

storing and accessing pre-categorized training data wherein the pre-categorized training data comprises elements and assigned labels;
accessing specified subsets of the pre-categorized training data;
accessing the elements the assigned labels in the specified subsets;
starting at the top of a hierarchy;
creating a base learner to learn a top down model for each category of the hierarchy using a basic representation and a specified subset of the training;
providing the base learner the specified subset of an entire set of pre-categorized training data as input;
storing top down model output from the base learner for a category to be used as part of a prediction model for the hierarchical learner;
estimating performance of the top down model learned for the category by;
partitioning the specified subset of the data into non-overlapping subsets;
for each subset, creating a stored output model comprising:
providing the base learner all but that subset as training data to obtain a base model;
using the top down model together with the base learner's prediction component to create a prediction for the category of every element in the subset withheld from training;
storing the predictions as stored predictions;
using the stored predictions over the specified subset and actual categories to assess performance of the base model;
using errors committed by the base model as well as the actual categories to compute a weighting of the examples that should be used as the training data at each child of the category;
storing this distribution to be used as the specified subset at the creating a base learner block;
repeating a creating a block learner block for each child category of the category,
using a top down prediction component that uses a stored output models to predict starting from a top-down by:
predicting membership at a topmost category;
for each category of which the element is predicted to be a member, predicting membership in that category's children,
continuing down the hierarchy until no further categories are predicted or the bottom of the hierarchy has been reached.

9. The computer storage medium of claim 8, further comprising computer executable instructions for:
learning bottom-up prediction models for each category in the hierarchy comprising:
starting at a lowest level of the hierarchy
for each element in the pre-categorized training data, creating an extended representation comprising extending a representation of an example with meta-attributes for the category computed using bottom-up prediction of all categories at lower levels than the category;
creating a learner comprising learning a prediction model for the category over a specified subset of the training data using the extended representation and storing this as a bottom-up model for the category to be used in a hierarchical model's prediction component;
estimating performance of the model learned for the category;
partitioning the specified subset of the data into non-overlapping subsets;
for each subset,
giving the learner all but the subset as the training data with the extended representation to obtain a model;
using the model together with the prediction model of the learner to predict the category of every element in the subset withheld from training;
storing the predictions as bottom-up predictions for the category for the elements in the subset;
for any element in a full pre-categorized training set but not in the specified subset given to the learner, using a stored bottom-up model to make predictions for those elements and storing them;
using the stored predictions over the pre-categorized training data and the actual categories to assess the performance of the base model;
using the errors committed by the bottom-up model at the category as well as the actual categories to compute a weighting of the examples that should be used at a parent as the training data in conjunction with errors and the actual categories from the parent's other children;
continuing until a root is reached.

10. The computer storage medium of claim 9, further comprising computer executable instructions for;
using a prediction component that uses the stored output models to predict by:
predicting pre-categorized training data as belonging to an initial set of bottom-up categories using predictions over a basic set of example attributes;
starting at the lowest level of the hierarchy that has descendants belonging to the bottom-up categories, predict membership at the category by:
using the bottom-up predictions of all categories below a level of the category' in the hierarchy to extend the representation of a document with metafeatures;
using the stored bottom-up model for this node in the hierarchy to make the prediction of this category's membership using the extended representation and store the prediction as the bottom-up prediction for the category;
continuing up the hierarchy, applying bottom-up models, predicting bottom-up membership and storing the metafeatures for each node in the hierarchy until the root is reached;
starting at the top of the hierarchy,
substituting the extended representation in the top down prediction component and
a stored top-down output models are used at each node in the hierarchy.

11. The computer storage medium of claim 9, wherein the specified subset comprises a weighting of the elements.

12. The computer storage medium of claim 9, wherein the specified subset comprising an inclusion decision.

13. The computer storage medium of claim 9, wherein errors comprise assigning data into an improper branch.

14. The computer storage medium of claim 9, wherein extended representation comprises extending the representation of an example with meta-attributes for the category computed using bottom-up predictions of all categories at lower levels than the category.

15. A computer system comprising a processor physically configured according to computer executable instructions for creating a hierarchical learner to electronically classifying data received from a source into a hierarchical tree of categories, the computer executable instructions comprising instructions for:
   storing and accessing pre-categorized training data wherein the pre-categorized training data comprises elements and assigned labels;
   accessing specified subsets of the pre-categorized training data;
   accessing the elements the assigned labels in the specified subsets;
   starting at the top of a hierarchy;
      creating a base learner to learn a top down model for each category of the hierarchy using a basic representation and a specified subset of the training;
         providing the base learner the specified subset of an entire set of pre-categorized training data as input;
         storing top down model output from the base learner for a category to be used as part of a prediction model for the hierarchical learner;
      estimating performance of the top down model learned for the category by:
         partitioning the specified subset of the data into non-overlapping subsets;
         for each subset, creating a stored output model comprising:
            providing the base learner all but that subset as training data to obtain a base model;
            using the top down model together with the base learner's prediction component to create a prediction for the category of every element in the subset withheld from training;
            storing the predictions as stored predictions;
      using the stored predictions over the specified subset and actual categories to assess performance of the base model;
      using errors committed by the base model as well as the actual categories to compute a weighting of the examples that should be used as the training data at each child of the category;
      storing this distribution to be used as the specified subset at the creating a base learner block;
      repeating a creating a block learner block for each child category of the category;
   using a top down prediction component that uses a stored output models to predict starting from a top-down by:
      predicting membership at a topmost category;
      for each category of which the element is predicted to be a member, predicting membership in that category's children;
      continuing down the hierarchy until no further categories are predicted or the bottom of the hierarchy has been reached.

16. The computer system 15, further comprising computer executable instructions for:
   learning bottom-up prediction models for each category in the hierarchy comprising:
      starting at a lowest level of the hierarchy
         for each element in the pre-categorized training data, creating an extended representation comprising extending a representation of an example with meta-attributes for the category computed using bottom-up prediction of all categories at lower levels than the category;
         creating a learner comprising learning a prediction model for the category over a specified subset of the training data using the extended representation and storing this as a bottom-up model for the category to be used in a hierarchical model's prediction component;
      estimating performance of the model learned for the category;
         partitioning the specified subset of the data into non-overlapping subsets;
         for each subset,
            giving the learner all but the subset as the training data with the extended representation to obtain a model;
            using the model together with the prediction model of the learner to predict the category of every element in the subset withheld from training;
            storing the predictions as bottom-up predictions for the category for the elements in the subset;
         for any element in a full pre-categorized training set but not in the specified subset given to the learner, using a stored bottom-up model to make predictions for those elements and storing them;
      using the stored predictions over the pre-categorized training data and the actual categories to assess the performance of the base model;
      using the errors committed by the bottom-up model at the category as well as the actual categories to compute a weighting of the examples that should be used at a parent as the training data in conjunction with errors and the actual categories from the parent's other children;
      continuing until a root is reached.

17. The computer system of claim 16, further comprising computer executable instructions for;
   using a prediction component that uses the stored output models to predict by:
      predicting pre-categorized training data as belonging to an initial set of bottom-up categories using predictions over a basic set of example attributes;
      starting at the lowest level of the hierarchy that has descendants belonging to the bottom-up categories, predict membership at the category by:
         using the bottom-up predictions of all categories below a level of the category' in the hierarchy to extend the representation of a document with metafeatures;
         using the stored bottom-up model for this node in the hierarchy to make the prediction of this category's membership using the extended representation and store the prediction as the bottom-up prediction for the category;
         continuing up the hierarchy, applying bottom-up models, predicting bottom-up membership and storing the metafeatures for each node in the hierarchy until the root is reached;
   starting at the top of the hierarchy,
      substituting the extended representation in the top down prediction component and
      a stored top-down output models are used at each node in the hierarchy.

18. The computer system of claim 15, wherein the specified subset comprises a weighting of the elements.

19. The computer system of claim 15, wherein the specified subset comprising an inclusion decision.

20. The computer system of claim 15, wherein extended representation comprises extending the representation of an example with meta-attributes for the category computed using bottom-up predictions of all categories at lower levels than the category.

* * * * *

UNITED STATES PATENT AND TRADEMARK OFFICE
CERTIFICATE OF CORRECTION

PATENT NO.         : 8,296,330 B2                                          Page 1 of 1
APPLICATION NO.    : 12/476898
DATED              : October 23, 2012
INVENTOR(S)        : Bennett et al.

It is certified that error appears in the above-identified patent and that said Letters Patent is hereby corrected as shown below:

In the Specification

Column 4, line 19, delete "thraining" and insert -- training --, therefor.

In the Claims

Column 11, line 57, Claim 16, after "system" insert -- of claim --.

Signed and Sealed this
Third Day of February, 2015

Michelle K. Lee
*Deputy Director of the United States Patent and Trademark Office*